Jan. 5, 1954     E. S. BESCH     2,664,939
SPORTSMAN'S SEAT
Filed Feb. 24, 1949
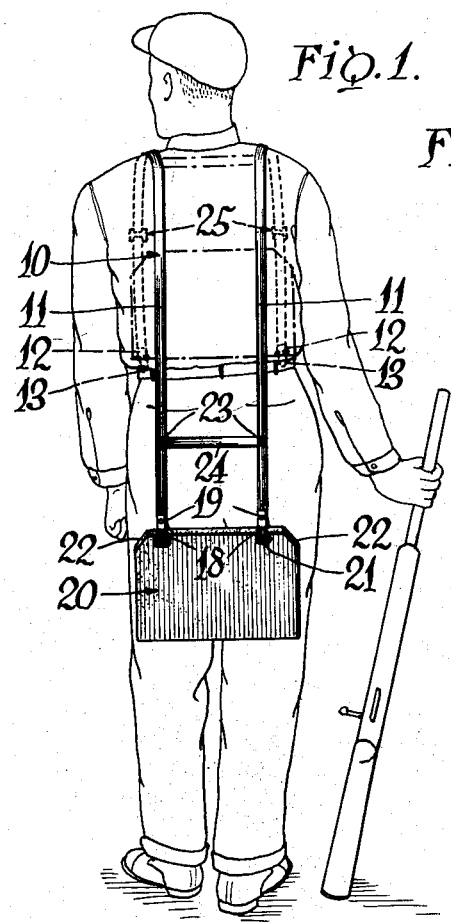
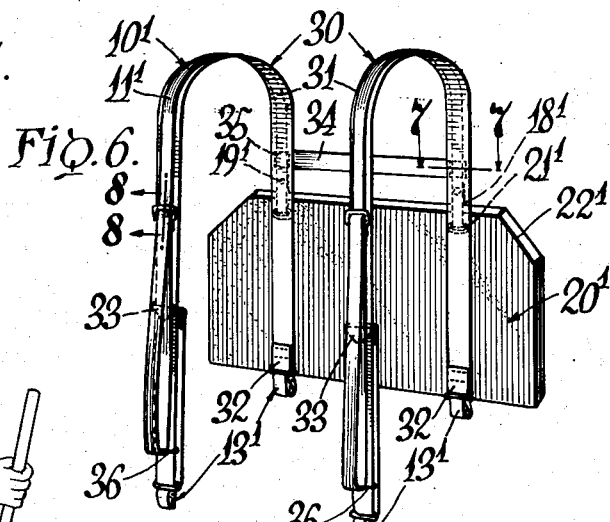
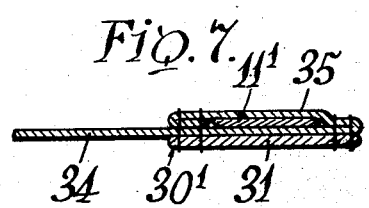
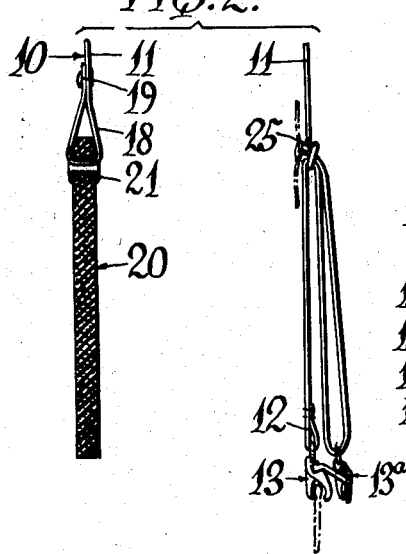
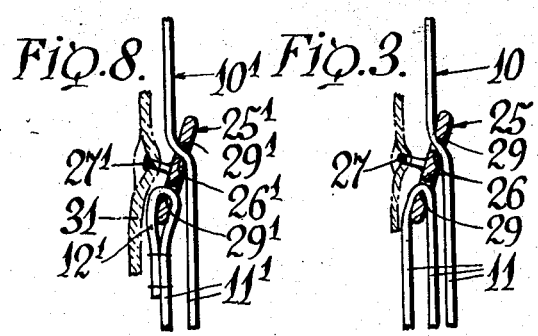
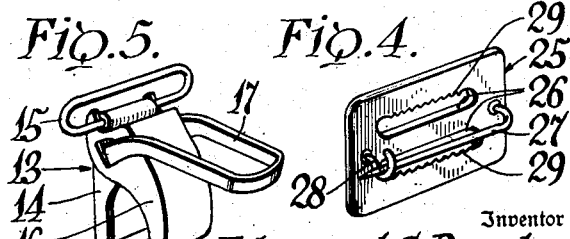
Inventor
Edmund S. Besch,
By Raymon E. Rousseau
Attorney Patented Jan. 5, 1954

2,664,939

UNITED STATES PATENT OFFICE 2,664,939

SPORTSMAN'S SEAT

Edmund S. Besch, Orchard Park, N. Y.

Application February 24, 1949, Serial No. 78,040

8 Claims. (Cl. 155—37)

This invention relates to portable seats and more particularly relates to a portable seat and an adjustable shoulder harness for supporting the seat in a raised carrying position and in a lowered position wherein the seat may be sat upon.

The objects of the present invention are to provide an attractive appearing comfortable, inexpensive water-proof resilient seat and a seat supporting harness for sportsmen, e. g. hunters, and others, to provide a harness readily attachable to the user's wearing apparel, for use somewhat in the manner of a pair of suspenders, and adjustably extensible so that a seat connected thereto may be moved from a carrying position on the user's back to a lowered position in which the seat may be sat upon when the user sits down, and to provide readily operable anchoring and adjusting means whereby the harness may be quickly anchored and adjusted to support the seat in positions desired by the user.

The foregoing and other objects of the invention will appear from a perusal of the description of the preferred embodiments illustrated in the accompanying drawing wherein:

Figure 1 is a rear view of a user equipped with one form of the seat and harness. The seat and harness being shown in its lowered position in full lines and the seat being shown in its raised position in dot and dash lines.

Figure 2 is a side elevational view of a portion of the harness adjusted to support the raised seat which is shown in section and showing the harness detachably connected to the seat.

Figure 3 is an enlarged vertical sectional view of a combined anchoring and adjusting device for securing the harness in selected positions.

Figure 4 is a rear perspective view of the combined anchoring and adjusting device.

Figure 5 is an enlarged perspective view of a harness attaching clip.

Figure 6 is a perspective view showing a modified form of adjustable harness connected to a seat.

Figure 7 is an enlarged horizontal sectional view taken on line 7—7 of Figure 6 showing a guide for one of the harness straps.

Figure 8 is an enlarged vertical sectional view taken on line 8—8 of Figure 6 showing one of the harness straps anchored to one of the combined anchor-adjusting devices.

The herein described forms of the harness and seat illustrated in the accompanying drawing are intended to exemplify the principles of the invention and it should be understood that within the scope of the appended claims, various modifications and changes may be made in the component parts and the arrangement of the seat and harness.

Referring now to Figure 1 it will be noted that the harness 10 comprises a pair of flexible shoulder straps 11 each formed at its front end with a loop 12 in the bight of which any suitable type of gripping device such as one of the clips 13 is attached for securing the front end of the straps to the wearing apparel of the user, i. e. the waistband of the trousers indicated by the broken lines in Figure 2.

The clip 13, best seen in Figure 5, is well known in the art and need not be described other than to say it comprises a rear jaw 14 having a wire loop 15 secured to its upper end for engagement with the bight 12 and thus suspending the clip therefrom. A front jaw 16 is pivotally connected to the rear jaw 14 by a yoke 17 the inturned ends of which pass through alined openings formed in the side walls of the jaws so that when the clip is open and the yoke is swung toward the clip the inturned ends engage cam surfaces formed in the openings and force the jaws together. The jaw 16 is formed with a lip which overlies and cooperates with a lip formed on the jaw 14 when the clip is closed so that when the clips are attached to the waistband of the trousers the ends of the straps 11 are securely anchored to the trousers. Upon swinging the yoke 17 away from the clip its jaws are forced open and the clip together with its associated strap may be removed from the waistband.

The straps 11 when fully extended as shown in Figure 1, are each of a length to extend from the clips 13, over the user's shoulders and down the user's back to a position below the user's buttocks. The straps 11 have their free ends passed through spaced grommets 21 secured in the upper edge portions of a resilient pad or seat 20 and are looped around the grommets 21 as at 18, and secured to the straps. The seat 20 being so suspended from the straps does not interfere with free movement of the user and due to its suspended position between the user's buttocks and knees may be sat upon when the user sits down.

The free rear ends of the straps 11 may be permanently connected to the seat 20 but are preferably provided with snap-fasteners 19 so that the resilient seat 20 may be readily detached from and used independently of the harness as a comfortable seat or as a kneeling pad, if the user desires to indulge in any activities requiring prolonged sitting or kneeling.

The resilient pad or seat 20 is preferably formed of a rectangular sheet of the so-called "sponge rubber" having its upper corners cut away as at 22 and its outer surfaces made smooth and impervious to the passage of moisture so that the seat can be used on wet surfaces without absorbing moisture. The smooth outer surfaces of the seat together with the cut away corners facilitate moving the seat over the user's clothing, especially when an outer coat is worn and the seat is moved between the clothing and the coat to its raised carrying position.

The straps 11, above their free ends 18, are connected together as at 23 by a cross-strap 24 which serves to limit upward movement of the straps by engaging the user's neck when they are drawn over the shoulders to raise the seat and to prevent the straps 11 from slipping off the user's shoulders. It should be noted that being impervious to moisture the seat protects the lumbar region of the user's back in its raised carrying position. Being so carried the seat is warmed by the user's body so that upon being lowered and sat upon provides a warm comfortable dry seat for the user regardless of the condition of the object upon which the seat is placed. It should be further noted that while the surface of the seat placed on cold damp objects may become wet that surface of the seat does not touch the user's body when the seat is again raised to its carrying positions.

In order to secure the seat in its lowered or raised position each of the straps 11 in the region of the user's chest, is provided with a readily operable anchor-adjusting device 25, comprising a rectangularly shaped plate formed with a pair of spaced parallel slots 26, a resilient pin 27 and a keeper 28 for the pin 27. The pin 27 and the keeper 28 are centrally secured to opposite ends of the back of the plate and a free portion of the pin is spaced from and extended across the plate for engagement under the keeper 28. The free end of the pin 27 being formed with a point may be passed through the user's wearing apparel, indicated in broken lines in Figures 1, 2 and 3, and engaged with the keeper 28, in the manner of a "safety pin," thus anchoring the plate in place.

The remote edges of the slots 26 are serrated to provide teeth 29 which, when the straps 11 are threaded through the slots as shown, slightly bite into and thus securely hold the straps in their adjusted positions.

Assuming that the harness is extended and the seat is down, as shown in full lines in Figure 1, it will be obvious that the seat is properly positioned to be sat upon when the user sits down and that when the user desires to restore the seat to its raised carrying position as indicated in broken lines in this figure: The devices 25 may be tilted forward to release the teeth 29 of the upper slot 26 from the associated strap 11 without disturbing the engagement of the teeth 29 of the lower slot 26 with the strap. So released the free portion of each strap may be drawn over the user's shoulders and through its associated device 25 to raise the seat and when the seat has been raised to a position determined by the cross-strap 24 engaging the base of the user's neck, or some intermediate position comfortable for the user, the devices 25 are reengaged with the straps 11 to secure the seat in its raised carrying position.

In adjusting the straps to raise the seat free loops are formed in the straps below the devices 25 as shown in Figure 2. The bight of each of the loops may be provided with means such as the clip 13a for securing the loop to the user's wearing apparel, or in the absence of the clips 13a the loops may be tucked under the anchored portion of the straps, tied thereto, or left to hang freely depending upon the desires of the user.

It is contemplated that the harness shown in Figures 1 and 2 may be simplified by eliminating the clips 13 and that portion of the straps which connect the clips to the devices 25. In such a simplified harness the devices 25 serve as the sole means of anchoring the one end of the straps to the user's wearing apparel when the straps are extended and the seat is in its lowered position, and when the seat is raised to its carrying position the loops formed in adjusting the straps are secured to the user's wearing apparel by the clips 13a. In this simplified harness the end of each of the straps 11 may be permanently anchored to one of the devices 25 in the manner shown in Figure 8, or the end of each strap may be detachably anchored to one of the devices 25 so that the straps may be adjusted to suit the user. For example the end of each strap may be threaded through one of the devices 25, as shown in Figure 3 and adjustably secured to the adjacent reach of the strap by any suitable means such as a conventional suspender slider.

Notwithstanding that the above described form of the invention may be worn equally well by persons wearing either a belt, or suspenders, or both, to support their trousers it is believed that some persons would prefer a seat supporting harness combined with a pair of trouser supporting suspenders and accordingly a modified form of seat supporting harness has been combined with a pair of modified suspenders as shown in Figure 6.

In the modified form of the invention I provide a pair of modified suspenders 30, and a modified harness 10' substantially the same as the harness 10. The suspenders 30 comprise a pair of flexible shoulder straps 31 each having its rear end formed with a loop 32 in the bight of which one of the clips 13' is secured. The front end of each strap 31 is doubled back on itself to form a loop in the bight of which another one of the clips 13' is slidably secured. The front end of each strap 31 carries a conventional suspender adjusting device 33 engageable with an adjacent portion of the strap 31 so that the length of the suspenders may be adjusted to suit the user. A cross-strap 34 is secured to the back portion of each of the straps 31 at points equally spaced above the rear clips 13' to prevent the straps 31 from slipping off the user's shoulders. The ends of the cross-strap 34 are conveniently formed with loops 35 for slidably connecting the harness 10' to the suspenders 30.

It will be noted that the parts of the harness 10', corresponding to similar parts of the harness 10, have been given the same reference numerals with prime exponents. The only difference between the harness 10 and the modified harness 10' being that the front ends of each of the shortened shoulder straps 11' is anchored, as by the loop 12' (Figure 8), to one of the anchor-adjusting devices 25' which is anchored, as by pinning it securely to the breast portion of the associated shoulder strap 31 of the suspenders 30, and that the front pair of clips 13 and the rear cross-strap 24 used with the harness 10 are not used with the harness 10':

In use the suspenders 30 carrying the harness 10' are securely anchored to the user's waistband by closing the clips 13'; so secured the shoulder straps 11', being of less width than the shoulder straps 31 overlie and slide thereover and slide through the loops 35 in adjusting the harness 10' to raise and lower the seat 20' in the manner above described. The free loops formed in adjusting the straps 11' may be slidably connected to the straps 31 by any suitable means such as the wire loops 36.

Being particularly adapted for use by hunters, who in some States for safety reasons are required by law to wear a red signal on their clothing to warn other hunters of their presence, the smooth outer surfaces of seats to be user by hunters are preferably colored a bright red to serve as a warning signal to other hunters. For other uses, not requiring a signal, the seats may have some different color.

What I claim is:

1. A portable seat for sportsmen comprising a flexible shoulder harness adapted to extend from the waist area up over the shoulders and down the back to below the buttocks of a user; a water-proof pad secured to the lower back ends of the harness; and means adapted to adjustably secure the front ends of the harness to the wearing apparel of the user, whereby the harness is adapted to support the pad in a lowered position below the user's buttocks for use as a seat and in a raised carrying position above the user's buttocks.

2. The combination set forth in claim 1 wherein the harness includes a pair of spaced flexible shoulder straps and a cross-brace located above the pad and having its opposite ends secured to the straps; said cross-brace being adapted to engage the neck of the user when the straps are drawn over the user's shoulders to raise the pad, thus serving to determine a raised carrying position of the pad and to prevent the straps from slipping off the user's shoulders.

3. The combination set forth in claim 1 wherein the waterproof pad is resilient and is detachably secured to the harness, whereby the pad may be readily detached for other uses independently of the harness.

4. The combination set forth in claim 1 wherein said means includes clips secured to the front ends of the harness and anchor-adjusting devices spaced above the clips and securable to medial portions of the harness, said clips and devices being adapted to cooperatively secure the harness to the user's wearing apparel and said devices being formed to normally grip engaged portions of the harness and being operable to release the harness, whereby the pad may be adjusted to and secured in selected lowered and raised positions.

5. A portable seat for sportsmen comprising a flexible shoulder harness including a pair of suspenders each adapted to extend from the waist area up over the breast and shoulders and down the back to the waist area of a user and each having their opposite ends provided with means adapted to secure them to the waist-band of the user's clothing, a flexible shoulder strap overlying each suspender and having its front end secured to the front portion of its suspender and its back end extended below the back end of its suspender and the buttocks of the user, and a water-proof pad secured to the back lower end of each strap, said straps thereby supporting the pad in a lowered position below the user's buttocks for use as a seat and being movable over the suspenders to lift the pad to a raised carrying position above the user's buttocks.

6. The combination set forth in claim 5 wherein the front portion of each suspender is provided with a strap anchor-adjusting device and the back portion of each suspender is provided with a strap guiding means for slidably securing each strap on its suspender, each of said devices normally gripping and holding its strap against movement and being operable to release the strap, whereby the straps may be adjusted and secured to support the pad in selected lowered and raised positions.

7. The combination set forth in claim 5 wherein the front portion of each suspender is provided with a strap anchor-adjusting device, the back portion of each suspender is provided with a strap guiding means adapted to slidably secure medial portions of each strap on its suspender and to limit upward movement of said pad, and a cross-brace secured to the back portion of each suspender is adapted to prevent the suspenders from slipping off the user's shoulders.

8. The combination set forth in claim 5 wherein the back portion of the suspenders are secured together by a cross-brace adapted to prevent the suspenders from slipping off the user's shoulders and said brace is formed at each of its ends with a guide loop embracing and slidably retaining one of the straps on its suspender.

EDMUND S. BESCH.

References Cited in the file of this patent

UNITED STATES PATENTS

| Number | Name | Date |
|--------|------|------|
| 636,108 | Blackman | Oct. 31, 1899 |
| 690,122 | Slagle | Dec. 31, 1901 |
| 1,369,456 | Meredith | Feb. 22, 1921 |
| 1,468,072 | Ogle | Sept. 18, 1923 |

FOREIGN PATENTS

| Number | Country | Date |
|--------|---------|------|
| 374,569 | Great Britain | June 16, 1932 |